United States Patent [19]

Arseneau

[11] Patent Number: 4,692,890
[45] Date of Patent: Sep. 8, 1987

[54] METHOD AND INTEGRATOR CIRCUIT FOR INTEGRATING SIGNALS, IN PARTICULAR FOR SCINTILLATION GAMMA CAMERA

[75] Inventor: Roger E. Arseneau, Arlington Heights, Ill.

[73] Assignee: Siemens Gammasonics, Inc., Des Plaines, Ill.

[21] Appl. No.: 614,886

[22] Filed: May 29, 1984

[51] Int. Cl.[4] .............................................. G06F 7/38
[52] U.S. Cl. ..................................... 364/733; 328/127
[58] Field of Search ...................... 364/723, 768, 605; 328/127

[56] References Cited

U.S. PATENT DOCUMENTS

| 3,538,317 | 11/1970 | Fukuda | 364/835 |
|---|---|---|---|
| 3,668,560 | 6/1972 | Padalino et al. | 322/9 |
| 3,904,530 | 9/1975 | Martone et al. | 250/369 |
| 3,984,689 | 10/1976 | Arseneau | 250/369 |
| 4,023,019 | 5/1977 | Leibowitz et al. | 364/733 |
| 4,030,038 | 6/1977 | Daniel et al. | 364/733 |
| 4,086,656 | 4/1978 | Brown | 364/733 |
| 4,486,663 | 12/1984 | Arseneau | 250/363 S |

FOREIGN PATENT DOCUMENTS 2148494A 5/1985 United Kingdom .

Primary Examiner—David H. Malzahn
Attorney, Agent, or Firm—Lawrence C. Edelman

[57] ABSTRACT

A method and integrator circuit for digitally integrating signals wherein digital signals to be integrated are supplied to a digital adder thereby generating digital adder output signals. Each digital adder output signal is stored and the stored digital adder output signal is refed to the digital adder. Each refed stored digital adder output signal is then added by the adder to a succeeding digital signal supplied to the adder for integration. In a preferred embodiment of the invention, the digital signals are analog-to-digital converted signals produced by a radiation detector, such as a scintillation gamma camera, generated from radiation impinging on the radiation detector.

21 Claims, 12 Drawing Figures

| | INPUT LINES | | |
|---|---|---|---|
| | 534 | 532 | 530 |
| CY1 | $Z_{s1}$ | $X_{s1}$ | $Y_{s1}$ |
| CY2 | $T_1, N_1, N_0$ | $E_{s1}$ | $Z_{s1}$ |
| CY1 | $Z_{s2}$ | $X_{s2}$ | $Y_{s2}$ |
| CY2 | $T_2, N_2, N_1$ | $E_{s2}$ | $Z_{s2}$ |

| | OUTPUT LINES | | |
|---|---|---|---|
| | 540 | 538 | 536 |
| | $Z_{s1}$ | $X_{p1} = \dfrac{X_{s1}}{Z_{s1}}$ | $Y_{p1} = \dfrac{Y_{s1}}{Z_{s1}}$ |
| | $Z_{s1}$ | $E_{p1}$ | $Z_{s1}$ |
| | $Z_{s2}$ | $X_{p2} = \dfrac{X_{s2}}{Z_{s2}}$ | $Y_{p2} = \dfrac{Y_{s2}}{Z_{s2}}$ |
| | $Z_{s2}$ | $E_{p2}$ | $Z_{s2}$ |

| | | | |
|---|---|---|---|
| TO 266 | $Y_{p1}$ | $X_{p1}$ | $E_{p1}$ |
| | $Y_{p2}$ | $X_{p2}$ | $E_{p2}$ |

FIG 9

METHOD AND INTEGRATOR CIRCUIT FOR INTEGRATING SIGNALS, IN PARTICULAR FOR SCINTILLATION GAMMA CAMERA

BACKGROUND OF THE INVENTION

1. Field of the Invention

The invention relates to a method and integrator circuit for integrating signals. In particular the invention relates to a method and integrator circuit for integrating signals derived from a radiation detector, such as a scintillation gamma camera.

2. Description of Prior Art

The U.S. Pat. No. 3,984,689 (Arseneau) describes a scintillation camera for high activity sources which comprises for each analog position coordinate signal and each analog energy signal an analog integrator circuit.

U.S. Pat. No. 4,486,663 entitled "Dual Integrator for a Radiation Detector⇌ of Roger E. Arseneau depicts a similar analog integrator circuit for each analog signal which includes two alternatively switchable integrators.

The U.S. Pat. No. 3,904,530 (Martone et al.) illustrates a scintillation camera which comprises an analog-to-digital converter for each position coordinate signal. However, the digitalized signals are not integrated. Integration, if any, is provided prior to digitalization.

SUMMARY OF THE INVENTION

1. Objects

It is an object of this invention to provide a method and integrator circuit for digitally integrating signals.

It is another object of this invention to provide a method and integrator circuit for digitally integrating signals derived from a radiation detector, such as a scintillation gamma camera.

2. Summary

According to this invention a method for digitally integrating signals is provided which comprises the steps of:

(a) supplying digital signals to be integrated to a digital adder thereby generating digital adder output signals;

(b) storing each digital adder output signal;

(c) refeeding each stored digital adder output signal to the digital adder; and (d) adding each refed stored digital adder output signal to a succeeding digital signal supplied to the adder for integration.

Also, according to this invention an integrator circuit for digitally integrating signals is provided which comprises:

(a) a digital adder having a first digital input for digital signals to be integrated and a second digital input and a digital output;

(b) a digital storage means having a digitial input connected with the digital output of the adder and having a digital output connected with the second digital input of the adder; and (c) a control means for controlling the adder and the storage means such that each digital signal fed from the digital output of the adder to the storage means is resupplied from the digital output of the storage means to the second digital input of the adder for being added to a succeeding digital signal appearing at the first digital input of the adder.

The method and integrator circuit according to this invention allow high speed digital integration and therefore are especially applicable for use in a radiation detector, such as a scintillation gamma camera. In a preferred embodiment analog signals can be digitalized by means of a high rate analog-to-digital converter and the digitalized signals are then integrated according to this invention. In case of a radiation detector such as a scintillation camera, the differential linearity becomes smoothed out by the analog-to-digital converter, since the sample rate prior to integration is much higher (e.g. approximately 20 samples per event) compared with the sample rate (e.g. 1 sample per event) after integration.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 9 is a diagram showing data information processed in the position calculator of FIG. 8;

DETAILED DESCRIPTION OF THE PREFERRED EMBODIMENT

Figure 1A:
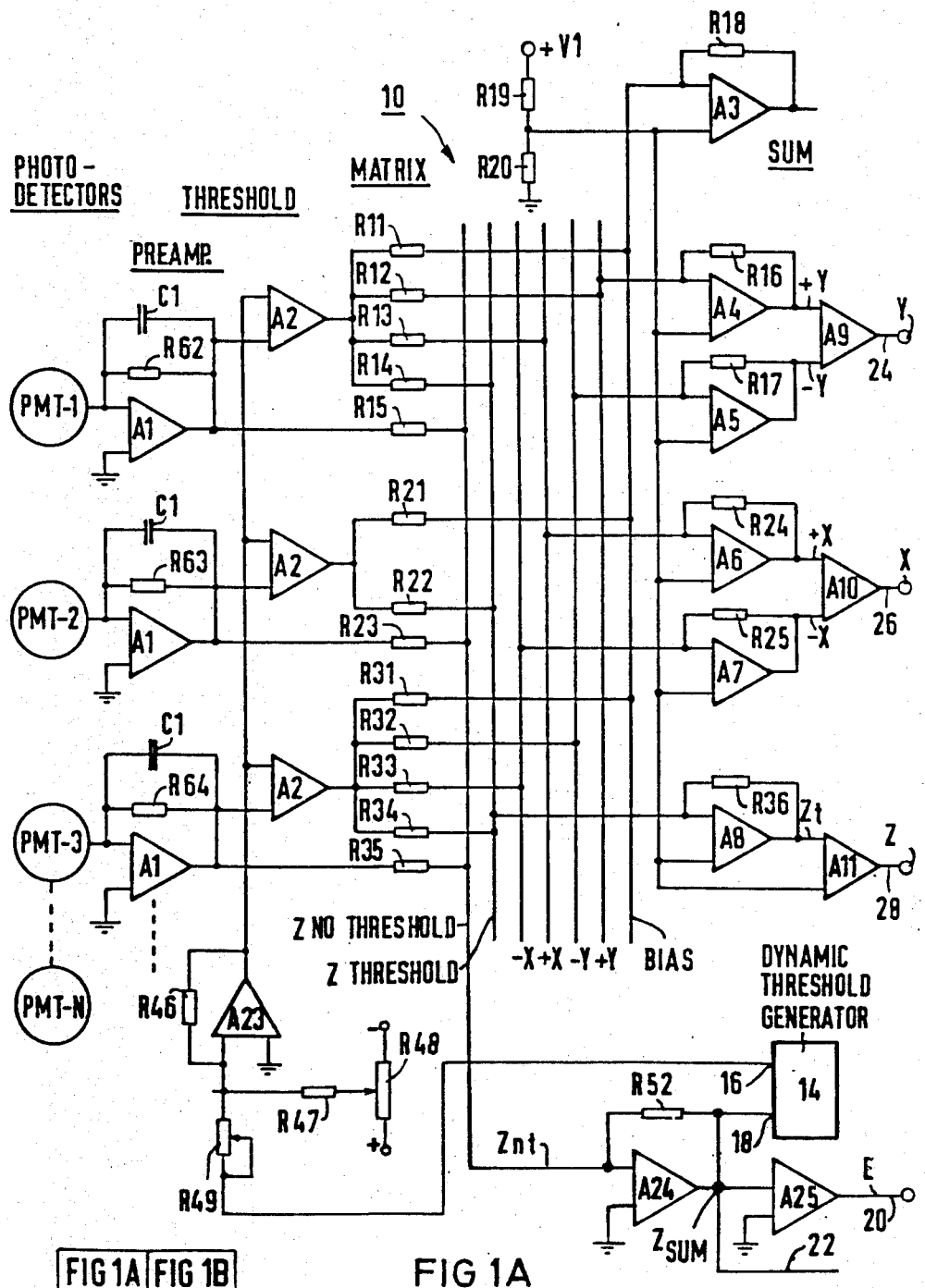
FIG. 1 is a schematic circuit diagram comprising an analog circuit portion (FIG. 1A) and a digital circuit portion (FIG. 1B) of a digital scintillation gamma camera including the invention.
Figure 1B:
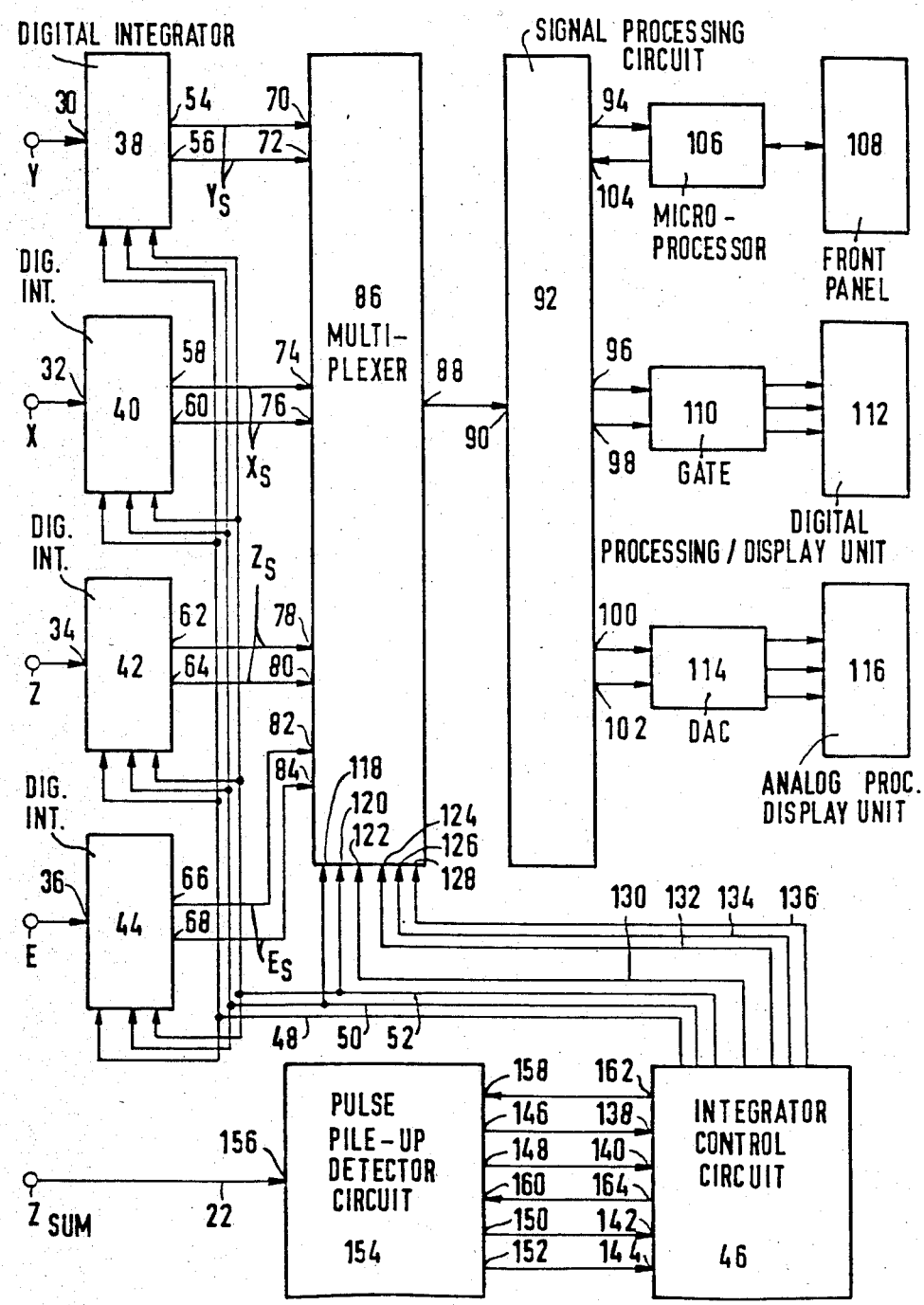

FIG. 1 illustrates in a schematic circuit a digital scintillation gamma camera which comprises an analog circuit portion 10, (FIG. 1A) and a digital circuit portion 12 (FIG. 1B).

According to FIG. 1A (which is very similar to FIG. 2A of the aforementioned U.S. Pat. No. 3,984,689) the analog circuit portion 10 comprises a number N (e.g. N=19–37) of photomultiplier tubes PM-1 to PM-N which are arranged in a hexagonal array behind a (not shown) scintillation crystal. The outputs of the photomultiplier tubes are connected in conventional manner via preamplifiers A1 and threshold amplifiers A2 with a matrix of weighting resistors (e.g. only R11 through R35 are indicated for the first three photomultiplier tubes PM-1, PM-2, PM-3). Each preamplifier A1 comprises a feedback loop with a capacitor C1 and an ohmic resistor R62, R63, R64, etc.

The thresholds of the threshold amplifiers A2 can be adjusted by means of amplifier circuit A23, R46, R47, R48, R49 and dynamic threshold generator 14 (which is illustrated in more detail in FIG. 11) via threshold generator output 16. An input 18 of the dynamic threshold generator 14 is connected with the output of amplifier A24 which comprises feedback resistor R52. The output signal of amplifier A24 is the total energy signal $Z_{sum}$. The amplifier input signal is the no threshold energy output signal $Z_{nt}$ of the resistor matrix.

The total energy signal $Z_{sum}$ is also supplied to a buffer amplifier A25 having an output 20 and to a signal line 22. The energy signal at the output 20 of buffer amplifier A25 is generally designated with E.

The output signals $+X+Y$ and $Z_t$ of the resistor matrix are supplied via amplifiers A4 to A8 (having feedback resistors R16, R17, R24, R25, R36 and being biased by means of biasing circuit A3, R18, R19, R20) to summing amplifiers A9, A10, A11 for generating analog position coordinate signals X and Y at outputs 24, 26 and an analog threshold energy signal Z at output 28.

As illustrated in FIG. 1B the position coordinate signals Y, X, and the threshold energy signal Z at the outputs 24, 26, 28 of summing amplifiers A9, A10, A11 and the energy signal E at output 20 of buffer amplifier A25 are supplied to inputs 30, 32, 34 and 36 of a first digital integrator 38, a second digital integrator 40, a third digital integrator 42 and a fourth digital integrator 44, respectively. Each digital integrator 38, 40, 42 and 44 (which comprises an input analog-to-digital converter as will be described in more detail with respect to FIG. 2) together with an integrator control circuit 46 forms an integrator circuit. The integrator control circuit 46 is connected with each digital integrator 38, 40, 42 and 44 by means of a first output bus 48, a second output bus 50 and a third output bus 52.

A first and second outputs 54, 56 for the digitally integrated position coordinate signal $Y_s$ of integrator 38, a first and second outputs 58, 60 for the digitally integrated position coordinate signal $X_s$ of integrator 40, a first and second outputs 62, 64 for the digitally integrated threshold energy signal $Z_s$ of integrator 42 and a first and second outputs 66, 68 for the digitally integrated energy signal $E_s$ of the digital integrator 44 are connected with corresponding inputs 70 to 84 of a multiplexer 86. An output 88 of the multiplexer 86 is connected with the input 90 of a signal processing circuit 92. The signal processing circuit 92 comprises outputs 94 to 102 and a further input 104.

The output 94 and the further input 104 of the signal processing circuit 92 are connected via a microprocessor 106 with the front panel 108 of the scintillation gamma camera control unit (not shown) for communication. The outputs 96 and 98 of the signal processing unit 92 are connected via gate 110 with a digital processing and/or display unit 112 and the outputs 100 and 102 are connected via a digital-to-analog converter 114 with an analog processing and/or display unit 116.

The multiplexer 86 comprises further inputs 118 to 128. The inputs 118, 120 are connected with the second and third output buses 50 and 52, respectively, of the integrator control circuit 46. The inputs 122, 124, 126 and 128 are connected with a fourth, fifth, sixth and seventh output buses 130, 132, 134 and 136 of the integrator control circuit 46, respectively.

The integrator control circuit 46 also comprises inputs 138 to 144 which are connnected with outputs 146–152 of a pulse pile-up detector circuit 154. A first input 156 of the pulse pile-up detector circuit 154 is connected via line 22 with the output of amplifier A24 (FIG. 1A). This first input 156 therefore receives the total energy signal $Z_{sum}$ of the analog circuit portion 10 of FIG. 1A. The pulse pile-up detector circuit 154 also comprises a second input 158 and a third input 160 which are connected with further outputs 162 and 164 of the integrator control circuit 46.

Figure 2:
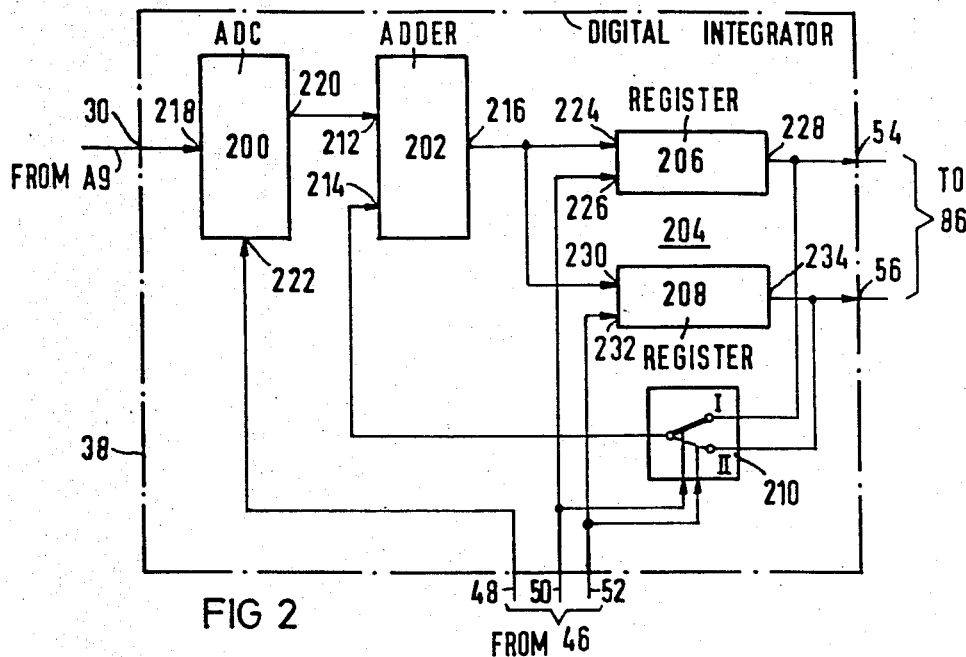
FIG. 2 is a more detailed circuit diagram of the inner structure of a digital integrator as shown in FIG. 1B.

FIG. 2 illustrats in more detail the internal structure of the first digital integrator 38. The second, third and fourth digital integrators 40, 42 and 44 in FIG. 1B have the same structure, respectively.

According to FIG. 2 the integrator 38 comprises an analog-to-digital converter 200. It further comprises a digital adder 202 and a digital storing device 204. The digital storing device 204 includes a first digital register 206, a second digital register 208 and a switch 210 (selector switch).

The digital adder 202 comprises a firt digital input 212 and a second digital input 214. It further has a digital output 216.

The analog-to-digital converter 200 includes an input 218 and an output 220. It further includes a control input 222.

The first digital register 206 comprises a digital input 224, an enable input 226, and a digital output 228. In the same manner the second digital register 208 contains a digital input 230, an enable input 232 and a digital output 234.

According to FIG. 2 the output 220 of the analog-to-digital converter 200 is connected with the first digital input 212 of the digital adder 202. The second digital input 214 of the digital adder 202 is connected with the digital output 228 of the first digital register 206 when switch 210 is in switch position I. The second digital input 214 of the digital adder 202 is connected with the digital output 234 of the second digital register 208 when the switch 210 is in position II.

The digital output 216 of the digital adder 202 is connected with both the digital input 224 of the first digital register 206 and the digital input 230 of the second digital register 208. By enabling the first digital register 206 via enable input 226 and non enabling the second digital register 208 the first digital register 206 takes over digital data from digital adder 202. By enabling the second digital register 208 via enable input 232 and non enabling the first digital register 206, the second digital register 208 correspondingly takes over digital information from digital adder 202.

The first and second digital registers 206 and 208 are alternatingly enabled on an event to event basis by integrator control circuit 46 via second and third output buses 50, 52 for time periods which correspond with the time periods being necessary for integrating a radiation event. For example the enabling time period for each digital register 206 or 208 is approximately 700 ns. However, in case of a pulse pile-up situation an earlier switching from one register to the other one is triggered by the integrator control 46 as will be described later in more detail.

The digital outputs 228 and 234 of the first and second digital registers 206 and 208 are switched simultaneously by switch 210.

That means that in time periods where the first digital register 206 is enabled, the digital output 228 of the first digital register 206 is connected with the second digital input 214 of the digital adder 202. Therefore the digital output signals of enabled first digital register 206 during first register enable time period are refed via second digital input 214 to the digital adder 202 for being added to a succeeding digital signal delivered from output 220 of the analog-to-digital converter 200 to the digital adder 202 via first digital input 212.

Correspondingly, in time periods where the second digital register 208 is enabled, the digital output 234 of this register 208 is switched to the second digital input 214 of the digital adder 202. The digital output signals of the second digital register 208 are now added in digital adder 202 to succeeding digital output signals of the analog-to-digital converter 200.

The sample rate of the analog-to-digital converter 200 which is controlled by the integrator control circuit 46 via bus 48 is for example 30 MHz, i.e. approximately 21 samples for a normal unpiled event. The number of samples can be decreased for the reason of detection of a pulse pile-up which will be explained later in more detail.

The digital output signals of the first and second digital registers 206, 208 are also supplied to integrator outputs 54 and 56 (register read out outputs) and from there via multiplexer 86 to the signal processing circuit 92 for further processing. Therefore, alternatingly in time periods where one register is fed with new information from digital adder 202 the other register can be read out via its associated read out output 54 or 56.

Figure 3:
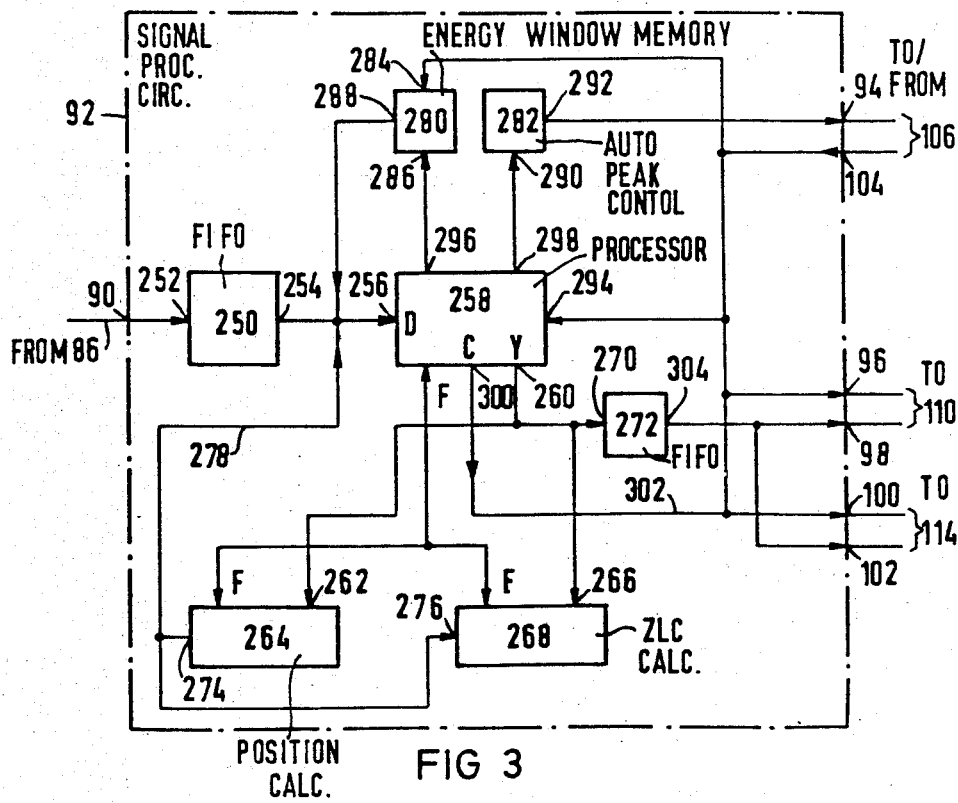
FIG. 3 is a more detailed circuit diagram of the inner structure of the signal processing circuit in FIG. 1B.

FIG. 3 depicts the signal processing circuit 92 in more detail. According to FIG. 3 the signal processing circuit 92 comprises in line with its input 90 a first in-/first out memory 250 (FIFO) which has a signal input 252 and a signal output 254. The signal output 254 of the FIFO 250 is connected with the data bus input 256 of a high speed processor 258. The data bus output 260 of the high speed processor 258 is connected with data bus input 262 of a position calculator 264, data bus input 266 of a ZLC calculator 268 and data bus input 270 of another first in/first out memory 272 (FIFO). The data bus output 274 of the position calculator 264 and the data bus output 276 of the ZLC calculator 268 are connected via bus 278 with the data bus input 256 of the high speed processor 258.

The signal processing circuit 92 also comprises an energy window memory 280 and an auto peak control unit 282 for calibrating purposes. The energy window memory 280 has a first data bus input 284, a second data bus input 286 and a data bus output 288. The auto peak control unit 282 has a data bus input 290 and a data bus output 292.

According to FIG. 3 the first data bus input 284 of the energy window memory 280 is connected with input 104 and the output 292 of the auto peak control unit 282 is connected with output 94 of the signal processing circuit 92. Input 104 of the signal processing circuit is also connected with another input 294 of the high speed processor 258. Under these circumstances the high speed processor 258, the energy window memory 280 and the auto peak control unit 282 are able to communicate with the front panel 108 via microprocessor 106.

The second data input 286 of the energy window memory is connected with a further output 296 of the high speed processor 258. The data bus input 290 of the auto peak control unit 282 is also connected with still another output 298 of the high speed processor 258. Furthermore, the data bus output 288 of the window memory 280 is connected with the data bus input 258 of the high speed processor 258.

The high speed processor 258 also comprises a clock output 300 with clock transmission line 302.

The data bus output 304 of the FIFO 272 is connected with outputs 98 and 102 of the signal processing circuit 92.

In the signal processing circuit according to FIG. 3 the FIFO 250 takes over output information from integrators 38, 40, 42 and 44 via multiplexer 86 and supplies it to the high speed processor 258 via data bus input 256. The data information leaving the high speed processor 258 at data bus output 260 is first fed to the position calculator 264 for position calculation and event correction (in cases of pulse pile-up) as will be later described in more detail in connection with FIGS. 8 and 9. The data information at data bus output 274 of the position calculator 264 is refed to the data bus input 256 of the high speed processor 258. The high speed processor 258 now transfers the data information to the ZLC calculator 268 via data bus input 266 for digital energy and position coordinate linearity correction in the manner as described for example for analog processing in U.S. Pat. Nos. 4,298,944 (Stoub et al.), 4,316,257 (Del Medico et al.) and 4,323,977 (Arseneau). The way the ZLC calculator 268 works will later be illustrated in more detail in connection with FIG. 10.

After data correction in the ZLC calculator 268 the corrected data is again refed from data bus output 276 of the ZLC calculator 268 to the high speed processor 258 via data bus input 256. The high speed processor 258 then supplies the data to FIFO 272 via data bus output 260. From FIFO 272 the data is then fed to outputs 98 and 102 of the signal processing cicuit 92 for being transferred to the digital processing and/or display unit 112 via gate 110 and the analog processing and/or display unit 116 via digital-to-analog converter 114.

During each resupply of an E energy signal data the high speed processor 258 checks whether or not the signal data lies within the energy window (stored in digital numbers for energy range) of the energy window memory 280. In case the signal data does not lie within the energy window the data is dumped as invalid. However, in case the signal data lies within the energy window it is further processed as a valid signal data.

Figure 4:
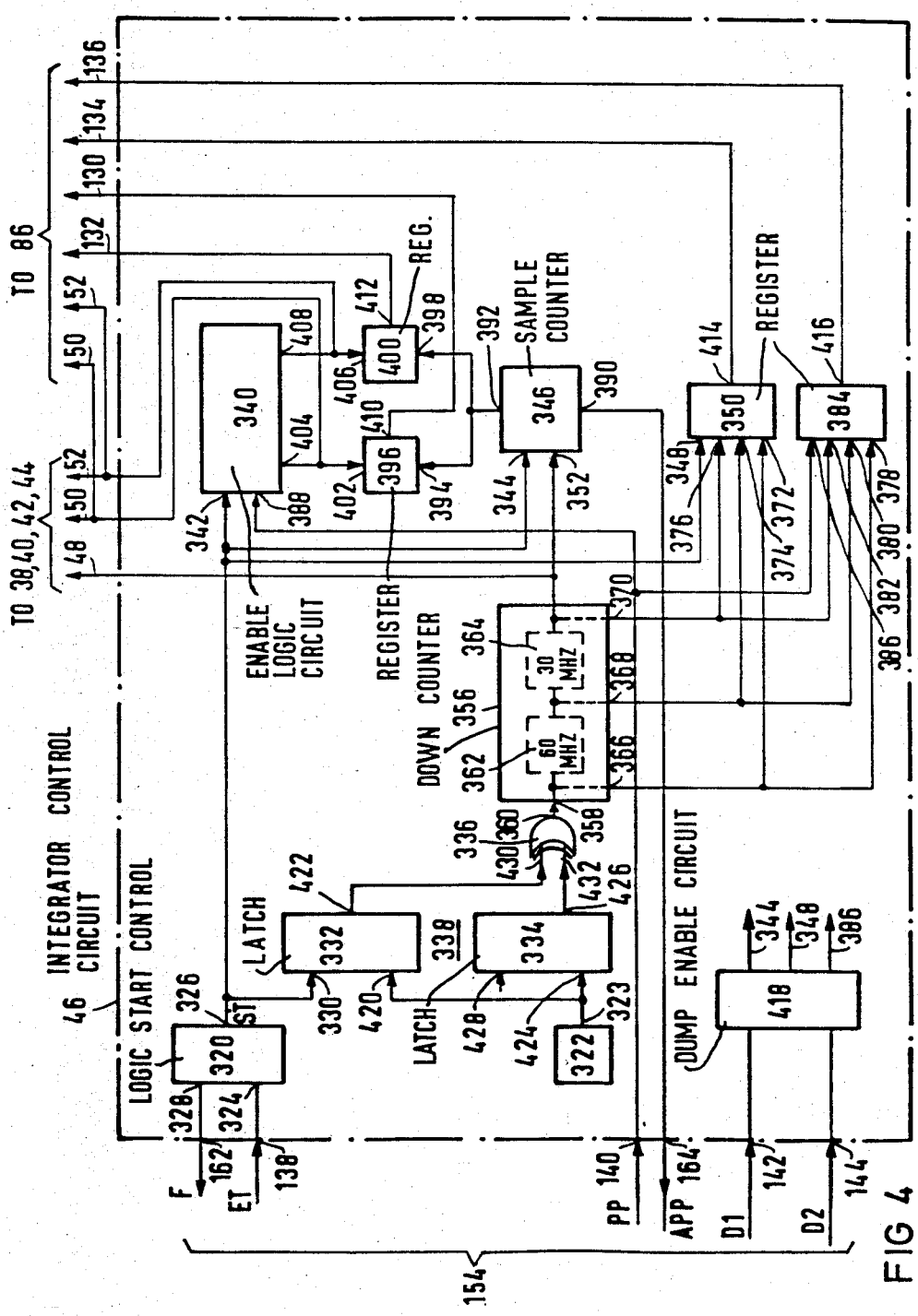
FIG. 4 is a more detailed circuit diagram of the inner structure of the integrator control circuit as shown in FIG. 1B.

FIG. 4 shows a more detailed diagram of the inner structure of the integrator control circuit 46. According to FIG. 4 the integrator control circuit 46 comprises a logic start control 320 and a 120 MHz oscillator 322. The logic start control 320 has an input 324 which is connected with the input 138 of the integrator control circuit 46. The logic start control 320 also comprises a first output 326 and a second output 328. The second output 328 is connected with the output 162 of the integrator control circuit 46. The input signal at input 138 of the integrator control circuit 46 and thus also at input 324 of the logic start control 320 is an event trigger pulse ET which is generated when an occurring event exceeds a given threshold as will later be described in more detail in connection with FIGS. 6 and 7. The signal at second output 328 of the logic start control 320 and therefore the signal at output 162 of the integrator control circuit 46 is a feed back pulse F generated by the logic start control 320 in response to an incoming event trigger pulse ET. The feed back pulse F holds the event trigger as will later be explained in more detail in connection with FIGS. 6 and 7.

The logic start control 320 also produces a start pulse ST at its first output 326. This start pulse ST is supplied to the lead input 330 of a first transparent latch 332 which together with a second transparent latch 334 and an exclusive OR gate 336 forms a phase controlled gate 338 for the output signals of the 120 MHz oscillator 322. The start pulse ST of the logic start control 320 is also fed to an enable logic circuit 340 via input 342, to the reset input 344 of a sample counter 346 and to the enable input 348 of a first register 350 for a subphase count.

The sample counter 346 comprises a counter input 352 which is connected with the counter output 354 of a down counter 356. The counter input 358 of the down counter 356 is connected with the output 360 of the exlusive OR gate 336.

The down counter 356 is subdivided in a 60 MHz portion 362 and a 30 MHz portion 364. It also comprises a 120 MHz output 366, a 60 MHz output 368 and a 30 MHz output 370. All three outputs 366–370 are connected with corresponding 120 MHz, 60 MHz and 30 MHz inputs 372, 374 and 376 of the first register 350 for a subphase count. They are also connected with corresponding 120 MHz, 60 MHz and 30 MHz inputs 378, 380 and 382 of a second register 384 for the subphase count. The enable input 386 of the second register 348 for the subphase count is connected with input 140 of the integrator control circuit 46. At this input 140 a pulse pile-up detection signal PP appears in a pulse pile-up situation.

The input 140 of the integrator control circuit 46 is also connected with an input 388 of the enable logic circuit 340.

The sample counter 346 comprises a first counter output 390 and a second counter output 392. The first counter output 390 is connected with the output 164 of the integrator control circuit 46. The sample counter 346 generates an activating signal APP for pulse pile-up detection as will later be more described in connection with FIGS. 6 and 7. The activating signal APP is supplied from output 164 of the integrator control circuit 46 to the pulse pile-up detector circuit 154.

The second counter output 392 of the sample counter 346 is connected with the input 394 of a first register 396 for the sample count and with the input 398 of a second register 400 for the sample count. The first register 396 for the sample count has an enable input 402 which is connected with the first output 404 of the enable logic circuit 340. Correspondingly, the second register 400 for the sample count has an enable input 406 which is connected with a second output 408 of the enable logic circuit 340. The first output 404 of the enable logic circuit 340 is also connected with the output bus 50 of the integrator control circuit 46. Correspondingly, the second output 408 of the enable logic circuit 340 is connected with the output bus 52 of the integrator control circuit 46.

Each register 396 and 400 for the sample count has also an output 410, 412, respectively. The output 410 of the first register 396 for the sample count is connected with the output bus 130 of the integrator control circuit 46. The output 412 of the second register 400 for the sample count is connected with the output bus 132 of the integrator control circuit 46.

The 30 MHz output 354 of the down counter 356 is also connected with output bus 48 of the integrator control circuit 46. Furthermore, the first register 350 for the subphase count comprises an output 414 which is connected with output bus 134 of the integrator control circuit 46. Accordingly, the second register 348 for the subphase count has an output 416 which is connected with the output bus 136 of the integrator control circuit 46.

The integrator control circuit 46 also comprises input 142 for a first dumping signal D1 and input 144 for a second dumping signal D2. The dumping signals D1 and D2 are supplied to a dump enable circuit for resetting the sample counter 346 and the first register 350 and the second register 384 for the subphase counts in case of the occurrence of an event which has an abnormal high level (dumping signal D1) and in case of the occurrence of a pile-up pulse which has a relatively low level (dumping signal D2).

In FIG. 4 the first transparent latch 332 comprises a signal input 420 and a signal output 422. Accordingly, the second transparent latch 334 comprises a signal input 424 and a signal output 426. It also comprises a lead input 428. The signal inputs 420 of the first transparent latch 332 and the signal input 424 of the second transparent latch 334 are connected with the output 323 of the 120 MHz oscillator 322. The signal output 422 of the first transparent latch 332 is connected with a first input 430 of the exclusive OR gate 336. Accordingly, the signal output 426 of the second transparent latch is connected with a second input 432 of the exclusive OR gate 336.

The operation of the integrator control circuit 46 according to FIG. 4 is as follows:

As mentioned before, each radiation event which exceeds a threshold level (for eliminating noise) generates an event trigger pulse ET. The event trigger pulse ET triggers the logic start control 320 to generate a start pulse ST.

The phase controlled gate 338 works such that the signal at output 422 of the first transparent latch 332 is always opposite to the signal at output 426 of the second transparent latch 334. When a start pulse ST in response to an event trigger pulse ET appears at lead input 330 of the first transparent latch 332 the phase controlled gate 338 becomes conductive for output signals of the 120 MHz oscillator 322 such that the next phase change of the 120 MHz oscillator 322 will cause a positive edge at output 360 of the exclusive OR gate 336 independent on the oscillator pulse polarity. This means the down counter 356 always starts under the same initial conditions at the occurrence of an event trigger pulse ET. The time information of the initial condition is memorized in the first register 350 for the subphase count which has been enabled at enable input 348 by means of the start pulse ST of the logic start control 320.

The 30 MHz output signal at output 354 of the down counter 356 is transferred via output bus 48 of the integrator control circuit 46 to the analog-to-digital converters 200 in the digital integrators 38–44. This causes each analog-to-digital converter 200 to sample the incoming event at a 30 MHz rate which means about 21 samples per event as mentioned before.

The 30 MHz output signals of down counter 356 are also supplied to sample counter 346 via counter input 352. After a certain number of counts, for example 10 counts, the sample counter 346 generates an activating signal APP for pulse pile-up detection at its first counter output 390. The pulse pile-up detector circuit 154 is now enabled for detecting a pulse pile-up situation, if there succeeds any.

The start pulse ST of the logic start control 320 resets the sample counter 346 via reset input 344 always at the occurrence of an event trigger pulse ET. At the same time the start pulse ST triggers the enable logic circuit 340 via input 342 to generate an enabling signal at output 404 or 408. For example, a first start pulse ST at the occurrence of a first event trigger pulse ET triggers the enable logic circuit 340 to produce an enable signal at the first output 404, the second start pulse ST at the occurrence of a second event trigger pulse ET triggers the enable logic circuit 340 to generate an enable signal at second output 408 a third start pulse ST at the occurrence of a third event trigger pulse ET triggers the enable logic circuit 340 to generate an enable signal again at first output 404, etc. According to alternatingly generating enable signals at first and second outputs 404 and 408 the first and second registers 206 and 208 in each digital integrator 38–44 are alternatingly enabled via output buses 50 and 52 and enable inputs 226 and 232, as previously described. Correspondingly, switch 210 in each digital integrator 38 to 44 is alternatingly switched from position I to position II.

The enable signals at outputs 404 and 408 of the enable logic circuit 340 also enable the first and second registers 396, 400 for the sample count via enable inputs 402 and 406 to alternatingly take over count information from sample counter 346 via inputs 394 and 398. For example, for the first event the first register 396, for the second event the second register 400, for a third event again the first register 396 etc., takes over the count information from sample counter 346. The contents of registers 396 and 400 can be read out alternatingly on demand of FIFO 250 in the signal processing circuit 92 via output buses 130 and 132 of the integrator control circuit 46 and multiplexer 86.

The enable logic circuit 340 works on an event to event basis in 700 ns time periods (time which is approximately needed for the integration of one event) as long as their does not occur a pulse pile-up situation.

In case a second event is piled-up on a first event in a pulse pile-up situation succeeding a pulse pile-up detection activating signal APP at output 164 of the integrator control circuit 46, a pulse pile-up detection signal PP is supplied to input 140 of the integrator control circuit 46. The pulse pile-up detection signal PP triggers the enable logic circuit 340 via input 388 to change the enable signal output situation. For example, when at the occurrence of the pulse pile-up detection signal PP an enable signal has been generated at the first output 404 of the enable logic circuit 340 the enable logic circuit 340 now switches from the first output 404 to the second output 408 to generate an enable signal at the second output 408 instead of the first output 404. Accordingly, the first register 206 in each digital integrator 38 to 44 becomes disabled and instead the second register 208 becomes enabled. Also switch 210 in each digital integrator is switched from position I to position II. The digital output signals of the adder 202 are now supplied to the second register 208 and the output signals of the second register 208 are resupplied via switch 210 to the second digital input 214 of adder 202 for integration.

Simultaneously with the enable logic circuit 340 the pulse pile-up detection signal PP also enables the second register 384 for the subphase count via enable input 386 to memorize the output status of down counter 356 at outputs 366, 368, 370 at the time of the occurrence of the pulse pile-up detection signal APP. In case the pile-up event remains on a low amplitude level a dumping signal D2 is generated at input 144 of integrator control circuit 46 and the sample counter 346 and the second register 384 for the subphase count are reset to dump the piled-up second (invalid) event. The preceeding (valid) event, however, continues to be processed in normal manner in the position calculator 264 of the signal processing circuit 92.

Under the circumstances described above, in an unpiled situation the first register 206 of each digital integrator 38, 40, 42 and 44 stores the information $Y_{s1}$, $X_{s1}$, $Z_{s1}$ and $E_{s1}$ of a first event respectively, and the second register 208 memorizes the digital information of $Y_{s2}$, $X_{s2}$, $Z_{s2}$ and $E_{s2}$ of a succeeding unpiled second event, respectively. Correspondingly, the first register 396 contains the sample count of sample counter 346 which belongs to the first event. The second register 400 contains the sample count of sample counter 346 which belongs to the unpiled second event. The first register 350 for the subphase count memorizes the starting times of the first and second events.

In a pulse pile-up situation the second register 384 for the subphase count memorizes the time of the occurrence of a pulse pile-up detection signal PP. Therefore, the output signal at ouput 416 of the second register 384 for the subphase count includes time information for the exact starting time of a second event piled-up on a first event.

In the pulse pile-up situation the status of registers 206, 208, 396 and 400 has been changed by means of enable logic circuit 340 at the occurrence of the pulse pile-up detection signal PP as described above. The information stored in the first registers 206 of the digital integrators 38, 40, 42 and 44 corresponds with the information $Y_{s1}$, $X_{s1}$, $Z_{s1}$ and $E_{s1}$ of the first event from starting time memorized in the first register 350 for the surface count until the starting time of the succeeding pile-up event. The first register 396 for the sample count of the integrator control circuit 46 contains the number of the last sample of the analog-to-digital converters 200 in each digital integrator 38, 40, 42 and 44 preceeding the starting time of the succeeding piled-up event. The second registers 208 in the digital integrators 38, 40, 42 and 44 start to memorize the digital information $Y_{s2}$, $X_{s2}$, $Z_{s2}$ and $E_{s2}$ of the piled-up second event together with the cut off tail of the preceeding first event. Correspondingly, the second register 400 of the integrator control circuit 46 starts to memorize the number of counts for the piled-up event and the cut off tail of the preceeding event beginning with the count of sample counter 346 which succeeds the last count stored in the first register 396 for the sample count.

Figure 5:
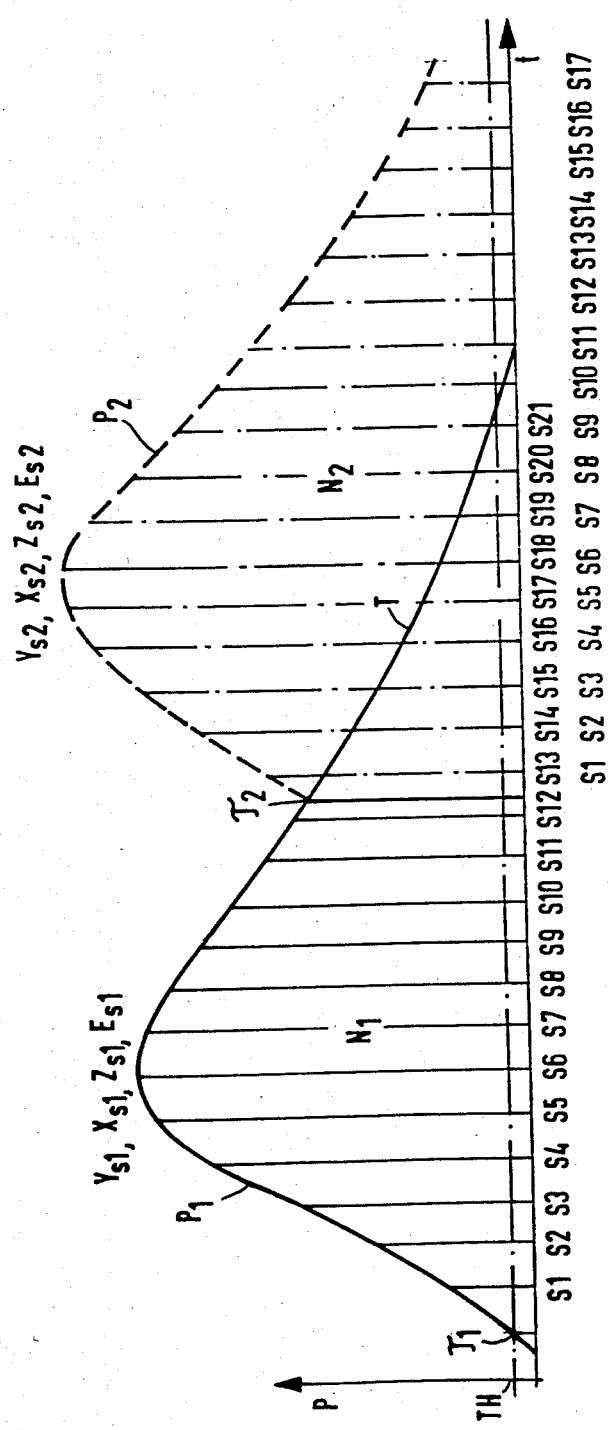
FIG. 5 is a pulse diagram illustrating a pulse pile-up situation.

The pulse pile-up situation as previously described is illustrated in more detail in FIG. 5. FIG. 5 shows in a diagram the shape of radiation events P dependent upon time t. A first event $P_1$ is succeeded by a piled-up second event $P_2$. The noise threshold is indicated with TH. An event trigger pulse ET is generated at time $\tau_1$ and a pulse pile-up detection signal PP is generated at time $\tau_2$. The time $\tau_1$ is memorized in the first register 350 for the subphase count of the integrator control circuit 46. The time $\tau_2$ is memorized in the second register 384 for the subphase count of the integrator control circuit 46. As described above, the signals $Y_{s1}$, $X_{s1}$, $Z_{s1}$ and $E_{s1}$ are memorized in the first registers 206 of the digital integrators 38–44. Correspondingly, the signals $Y_{s2}$, $X_{s2}$, $Z_{s2}$ and $E_{s2}$ are going to be memorized in the second registers 208 of the digital integrators 38–44. The count number $N_1$ is memorized in the first register 396 and the count number $N_2$ is going to be memorized in the second register 400 of the integrator control circuit 46.

As indicated in FIG. 5 each event is subdivided in 21 samples S1 to S21. In case of first event $P_1$ the last sample prior to the occurrence of a pulse pile-up detection signal PP at time $\tau_2$ is the sample which is designated with the number S12. This number is stored in the first register 396 for the sample count of the integrator control circuit 46. The thirteenth sample S13 is the first sample of the piled-up event $P_2$ including the tail T of the first event $P_1$.

The $Y_{s1}$, $X_{s1}$ and $Z_{s1}$ signal information of first event $P_1$ with cut off tail T is sufficient for ratio calculation of the coordinate position $Y_{p1} = Y_{s1}/Z_{s1}$ and $X_{p1} = Y_{s1}/Z_{s1}$ of the first event $P_1$ by means of the position calculator 264. However, the information with respect to energy signal $E_{s1}$ is incomplete. Nevertheless, the correct energy signal $E_{p1}$ of event $P_1$ can easily be reconstructed from incomplete $E_{s1}$ in the position calculator 264 by adding calculated samples S13-S21 of event $P_1$. Samples $S_{13}$-$S_{21}$ of event $P_1$ can be easily calculated from incomplete signal $E_{s1}$ since the shape of the information signal for each event follows a known equation. Consequently, using the amplitude and duration information for event $P_1$ stored in registers 206, 350 and 384, cutoff tail T can be calculated. Under these circumstances, cut off tail T is added to $E_{s1}$ of event $P_1$ in the position calculator 264 for calculating the correct energy signal $E_p$.

Piled up event $P_2$ can be corrected correspondingly. The samples of tail T which are added to $E_{s1}$ of event $P_1$ are now subtracted from $E_{s2}$ of piled-up event $P_2$. The exact time for starting subtracted is given by $\tau_2$.

For each event P the position coordinate signals $X_p$ and $Y_p$ are calculated in a first calculating cycle and the energy signals $E_p$ are calculated in a succeeding second cycle, as will later be explained in more detail in connection with FIGS. 8 and 9.

Figure 6:
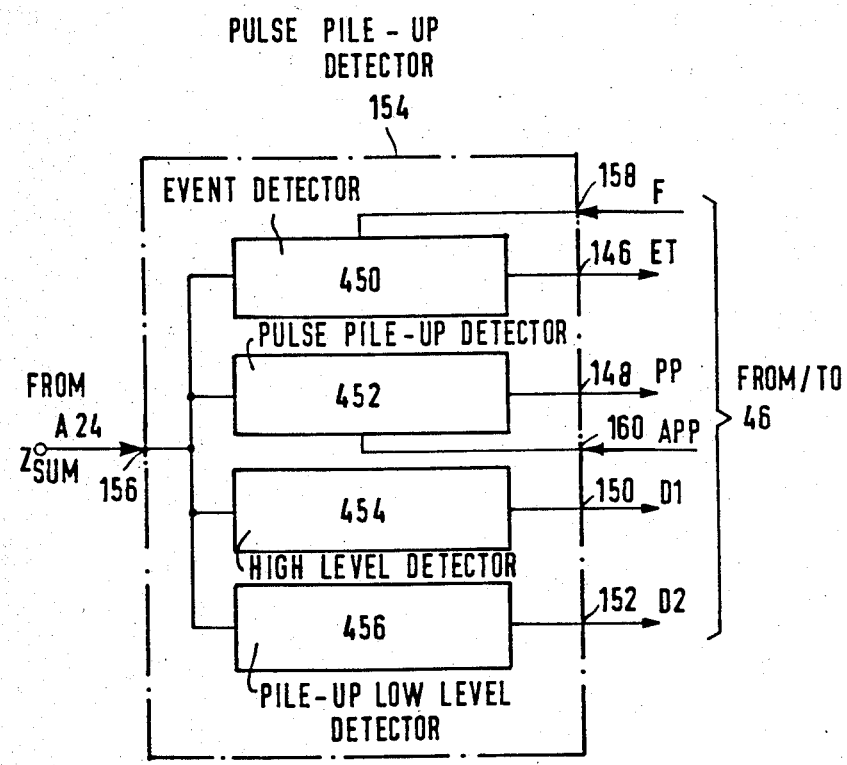
FIG. 6 is a more detailed circuit diagram of the inner structure of the pulse pile-up detector circuit in FIG. 1B.

FIG. 6 shows a more detailed circuit diagram of the inner structure of the pulse pile-up detector circuit 154 in FIG. 1B. According to FIG. 6 the pulse pile-up detector circuit 154 comprises an event detector 450, a pulse pile-up detector 452, a high level detector 454 and a pulse pile-up low level detector 456.

Figure 7:
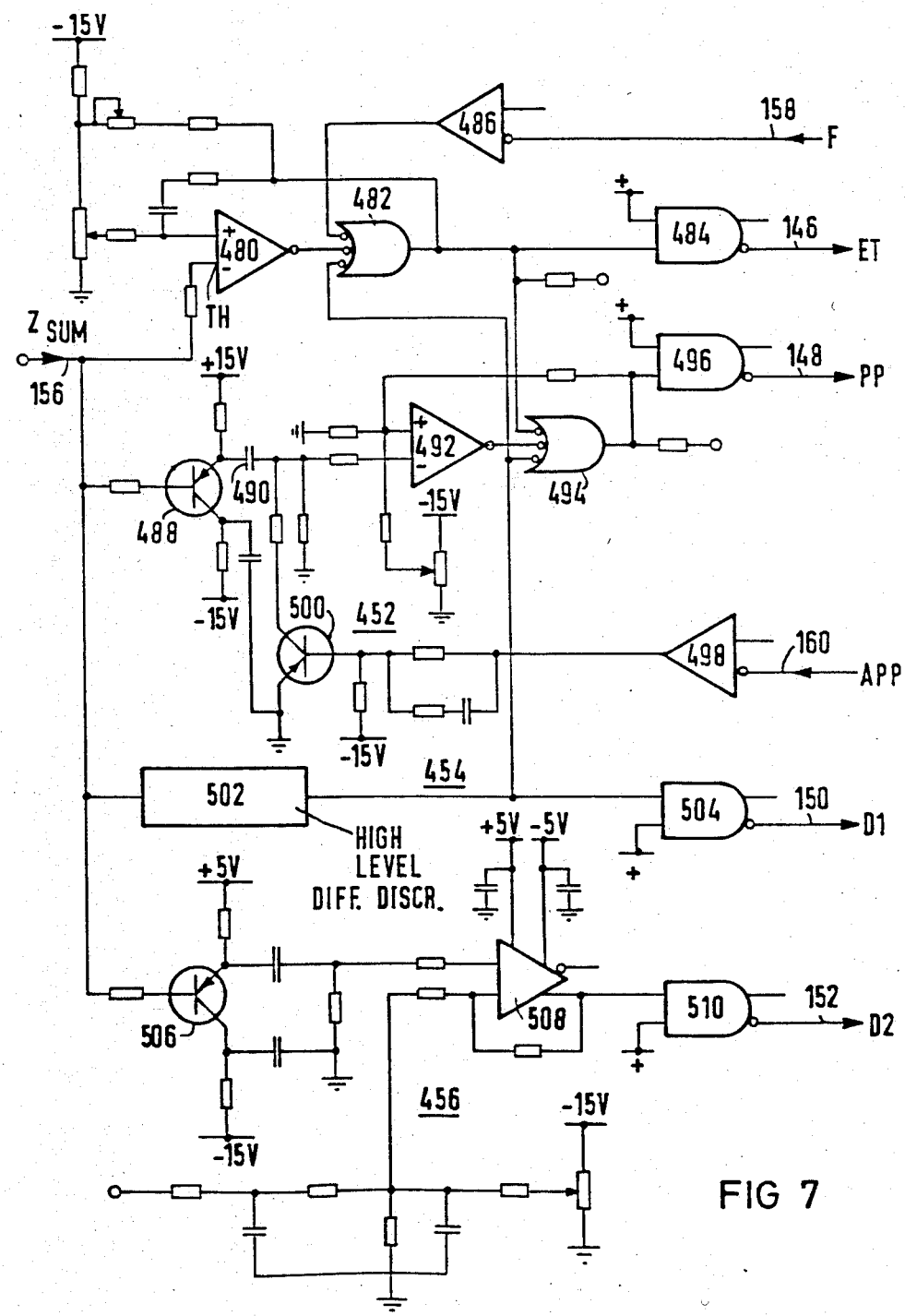
FIG. 7 is a still more detailed circuit diagram of the inner structure of the pulse pile-up detector circuit according to FIG. 6.

A still more detailed circuit diagram of the inner structure of the pulse pile-up detector circuit 154 according to FIG. 6 is illustrated in FIG. 7.

According to FIG. 7 the signal $Z_{sum}$ at input 156 is supplied to a threshold amplifier 480 for events which exceed the noise threshold TH. The output signal of the threshold amplifier 480 generates an event trigger pulse ET via gates 482 and 484. The feedback signal F is refed via amplifier 486 to gate 482. The event trigger pulse ET is held by means of the feedback signal F until the event at the input of the threshold amplifier 480 falls again below the noise threshold TH. The signal $Z_{sum}$ is also supplied to the base of transistor 488, the emitter of which is connected with one electrode of a capacitor 490. The other electrode of the capacitor 490 is connected via amplifier 492 and gates 494 and 496 with output 148 for the pulse pile-up detection signal PP. The capacitor 490 is biased by the activating signal APP for pulse pile-up detection via amplifier 498 and transistor 500. In a pulse pile-up situation an event piled-up on a preceeding event is detected by a potential change occurring in capacitor 490 in case the activating signal APP has already been applied to capacitor 490. The immediate result of the potential change in capacitor 490 is the pulse pile-up detection signal PP at output 148.

The signal $Z_{sum}$ is also supplied to a high level differential discriminator 502 which has a similar structure as the one described in columns 12 and 13 of Arseneau's U.S. Pat. No. 3,984,689. The high level differential discriminator 502 together with gate 504 forms the high level detector for high level events which have to be dumped.

Finally, the signal $Z_{sum}$ is also supplied to the base of transistor 506 which together with a threshold amplifier 508 and gate 510 forms the pulse pile-up lower level detector 456.

Figure 8:
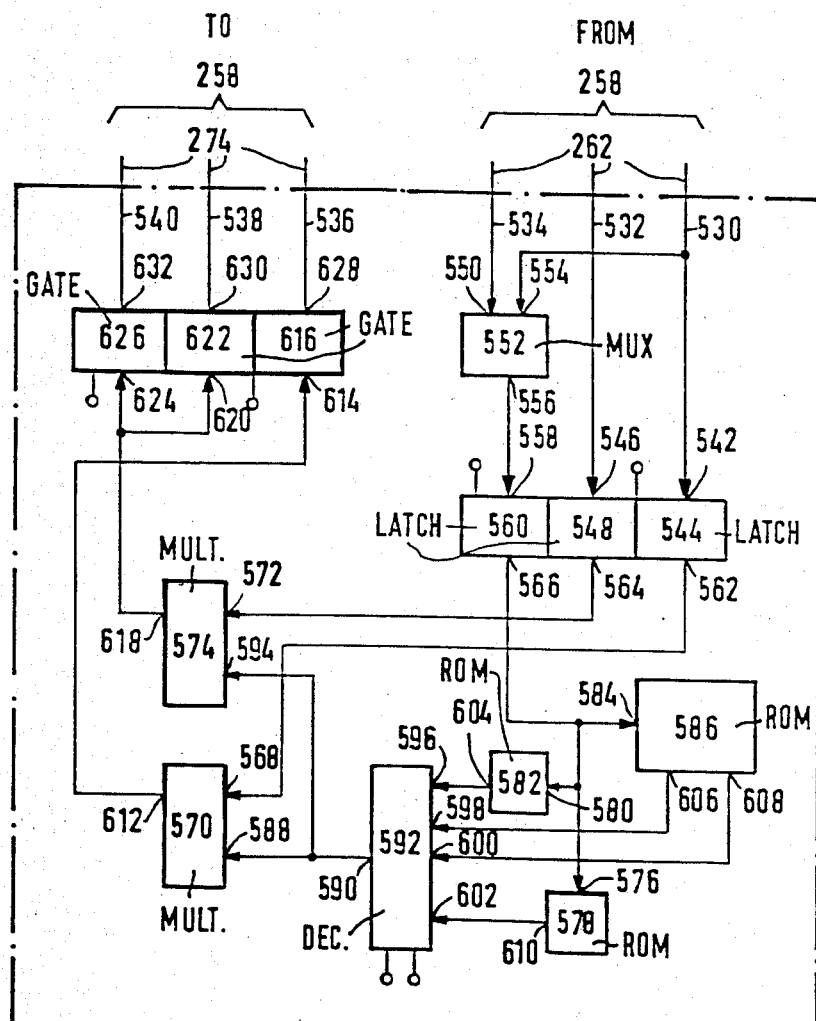
FIG. 8 is a more detailed circuit diagram of the inner structure of the position calculator in FIG. 3.

Referring now to FIG. 8, this figure shows a more detailed circuit diagram of the position calculator 264 in FIG. 3. The input lines 530, 532 and 534 form together the data bus input 262 of the position calculator 264. Correspondingly the output lines 536, 538 and 540 form the data bus output 274 of the position calculator 264.

The input line 530 is connected with the input 542 of a first latch 544. The input line 532 is connected with the input 546 of a second latch 548. The input line 534 is connected with a first input 550 of a multiplexer 552 which has a second input 554 which is connected with the input line 530. The output 556 of the multiplexer is connected with the input 558 of a third latch 560.

The first, second and third latches 544, 548 and 560 have each an output 562, 564 and 566, respectively. Output 562 of the first latch 544 is connected with the first input 568 of a first multiplier 570. The output 564 of the second latch 548 is connected wtih a first input 572 of a second multiplier 574. The output 566 of the third latch 560 is connected with the input 576 of a first ROM 578, with the input 580 of a gate 582 and with the input 584 of a second ROM 586.

The first multiplier 570 comprises a second input 588 which is connected with the output 590 of a decoder 592. Also the second multiplier 574 comprises a second input 594 which is connected with the output 590 of the decoder 592.

The decoder 592 comprises a first, second, third and fourth inputs 596, 598, 600 and 602. The first input 596 is connected with the output 604 of gate 582. The second input 598 is connected with a first output 606 of the second ROM 586. The third input 600 of the decoder 592 is connected with a second output 608 of the second ROM 586. The fourth input 602 is finally connected with the output 610 of the first ROM 578.

The output 612 of the first multiplier 570 is connected with the input 614 of a first output gate 616. Correspondingly, the output 618 of the second multiplier 574 is connected with the input 620 of a second output gate 622 and with the input 624 of a third output gate 626. The first output gate 616 comprises an output 628 which is connected with output line 536 of the position calculator 264. Correspondingly, the second output gate 622 comprises an output 630 which is connected with output line 538 and the third gate 626 comprises an output 632 which is connected with output line 540 of the position calculator 264.

The operation of the position calculator 264 according to FIG. 8 is in light of the diagram of FIG. 9 as follows:

In a first cycle CY1 for processing of the first event $P_1$, $Z_{s1}$ is supplied to input line 534, $X_{s1}$ is supplied to input line 532 and $Y_{s1}$ is supplied to input line 530 of position calculator 264. The signal $Z_{s1}$ is transferred through multiplexer 552 and third latch 560 to gate 582 via input 580 and first ROM 578 via input 576. The signal $Z_{s1}$ passes gate 582 to decoder 592 and is then supplied from output 590 of decoder 592 via multiplier 574 and third gate 626 to output line 540 of the position calculator 264. In the first ROM 578 the inverse signal $1/Z_{s1}$ is formed from the signal $Z_{s1}$. The inverse signal $1/Z_{s1}$ is delivered via decoder 592 to second input 588 of the first multiplier 570 and to the second input 594 of the second multiplier 574.

The signal $Y_{s1}$ on input line 530 is transferred via first latch 544 to the first input 568 of the first multiplier 570. Correspondingly, the signal $X_{s1}$ on input line 532 is supplied via second latch 548 to the second input 572 of the second multiplier 574.

The first multiplier 570 multiplies the signal $Y_{s1}$ with the inverse signal $1/Z_{s1}$ of first ROM 578. Correspondingly, the second multiplier 574 multiplies the signal $X_{s1}$ with the inverse signal $1/Z_{s1}$. The output signal $Y_{p1} = Y_{s1}/Z_{s1}$ of the first multiplier 570 is delivered via first gate 616 to output line 536 of the position calculator 264. Correspondingly, the output signal $X_{p1} = X_{s1}/Z_{s1}$ of the second multiplier 574 is supplied via second gate 622 to output line 538 of the position calculator 264.

In a second processing cycle CY2 for the first event $P_1$ the signals $\tau_1$, $N_1$ and $N_o$ are supplied via input line 534, multiplexer 552 and third latch 560 to the first ROM 586 via input 584. The second ROM 586 comprises a look-up table for correction counts in case of a pile-up situation. In the present case there exists a pile-up situation, since the second event $P_2$ is piled-up on the first event $P_1$. Under these circumstances, starting from $\tau_2$ counts have to be added to the signal $E_{s1}$ on input line 532 of the position calculator 264. For this purpose, the second ROM 586 generates a tail correction signal at first output 606 which is delivered via decoder 592 to the second input 594 of the second multiplier 574. The signal $E_{s1}$ which is supplied via second latch 548 to the first input 572 of the second multiplier 574 is multiplied by the tail correction signal and the corrected signal $E_{p1}$ is furnished from the second multiplier 574 via second output gate 622 to output line 538 of the position calculator 264.

The signal $Z_{s1}$ on input line 530 is delivered via first latch 544, first multiplier 570 and first output gate 616 to output line 536 of the position calculator 264.

For the piled-up second event $P_2$, which starts at time $\tau_2$, the position coordinate signals $X_{p2} = X_{s2}/Z_{s2}$ and $Y_{p2} = Y_{s2}/Z_{s2}$ are calculated again in a first cycle CY1 in the same manner as described above for $X_{p1}$ and $Y_{p1}$ of event $P_1$. However, the signal $E_{s2}$ has now to be corrected by subtracting the additional counts which have been added to $E_{s1}$ of the event $P_1$ in cycle CY2 of this event. For this purpose, dependent on the signals $\tau_2$, $N_2$, $N_1$ delivered to the second ROM 586 via multiplexer 552 and third latch 560, the second ROM 586 at its second output 608 generates a correction signal for the signal $E_{s2}$ for tail subtraction. This correction signal is supplied via decoder 592 to second multiplier 574. The second multiplier 574 multiplies the signal $E_{s2}$ which is delivered via input line 532 and second latch 548 to second multiplier 574 with the correction signal of the second ROM 586. The corrected output signal $E_{p2}$ of the second multiplier 574 is supplied via second gate 622 to output line 538 of position calculator 264. The signal $Z_{s2}$ on input line 530 is again delivered via first latch 544, first multiplier 570 and first gate 616 to output line 536 of the position calculator 264.

All output signals on output lines 536, 538 and 540 are refed from data bus output 274 of the position calculator 264 to the data bus input 256 of the high speed processor 258. The high speed processor 258 then feeds signals $Y_{p1}$, $X_{p1}$ and $E_{p1}$ for the first event $P_1$ and signals $Y_{p2}$, $X_{p2}$ and $E_{p2}$ for the piled-up second event $P_2$ via data bus output 260 and data bus input 266 to the ZLC calculator 268 for ZL-correction.

Figure 10:
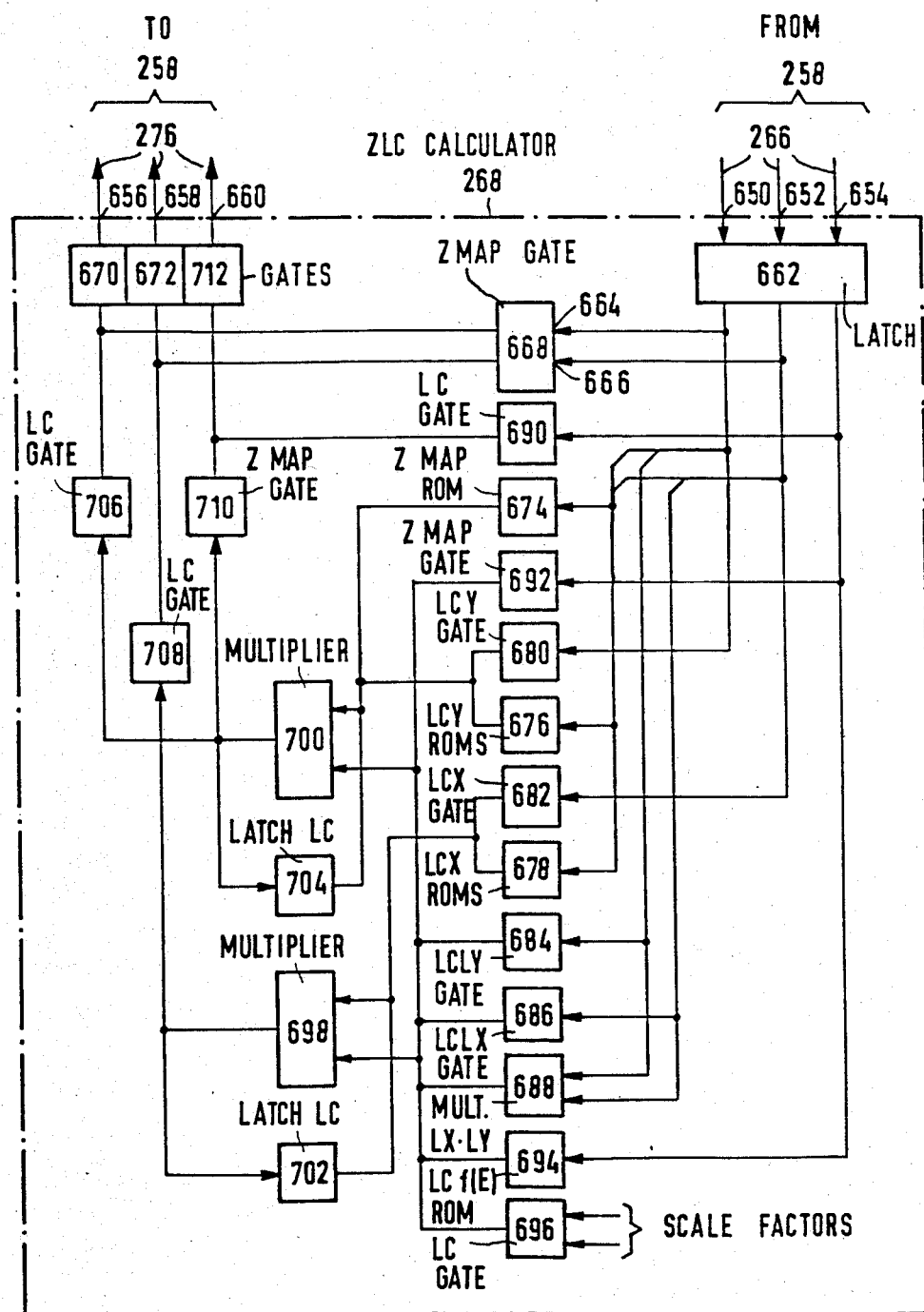
FIG. 10 is a more detailed circuit diagram of the inner structure of the ZLC calculator in FIG. 3.

A more detailed circuit diagram of the ZLC calculator 268 is illustrated in FIG. 10.

According to FIG. 10 the input lines 650, 652 and 654 form together the data bus input 266 of the ZLC calculator 268. Accordingly, the output lines 656, 658 and 660 form the data bus output 276 of the ZLC calculator 268. The first input line 650 is fed with the signal $Y_p$, the second input line 652 is fed by the signal $X_p$ and the third input line 654 is fed with the signal $E_p$.

After passing an input latch 662 the signals $Y_p$ and $X_p$ are delivered to the inputs 664 and 666 of a Z map gate 668. The Z map gate 668 allows for a transfer of the signals $Y_p$ and $X_p$ to output lines 656 and 658 of the ZLC calculator 268 via a first output gate 670 and a second output gate 672.

The signals $Y_p$ and $X_p$ are also supplied to a Z map ROM 674, LCY ROMs 676, LCX ROMs 678, a LCY gate 680, a LCX gate 682, a LCLY gate 684, a LCLX gate 686 and a LXLY multiplier 688, respectively.

The signal $E_p$ on line 654 is supplied via latch 662 to a LC gate 690, a Z map gate 692 and a LCf(E) ROM 694.

An LC gate for scale factors is generally designated with 696. All elements 690 to 696 are connected with output lines 656, 658 and 660 of the ZLC calculator 268 by means of a first multiplier 698, a second multiplier 700, a first and second LC latches 702 and 704, a first and second LC gates 706 and 708, a Z map gate 710 and the first, second and a third gates 670, 672 and 712 in the manner as illustrated in FIG. 10.

The LC gate 690 allows $E_p$ to pass during linearity correction. The Z map ROM 674 contains the energy correction coefficients. The Z map gate 692 allows $E_p$ to transfer for energy correction. The LCY gate 680 correspondingly allows $Y_p$ to transfer for $Y_p$ linearity correction. The coefficients for $Y_p$ correction are stored in the LCY ROMs 676. The LCX gate 682 transfers the $X_p$ signal for linearity correction. The coefficients for the $X_p$ correction are stored in the LCX ROMs 678.

The LCLY gate 684 and the LCLX gate 686 transfer the signals $Y_p$ and $X_p$ for correction with interpolation factors. The LXLY multiplier 688 finally generates the cross product LX·LY for the interpolation factors.

All corrections are digitally executed according to the same algorithms as described in U.S. Pat. Nos. 4,298,944 (Stoub et al.), 4,316,257 (DelMedico et al.) and 4,323,977 (Arseneau) for the correction of analog signals.

The energy $E_p$ is corrected in a first cycle of means of second multiplier 700. In case the corrected signal $E_{pc}$ is valid (energy window checking) the position coordinate signals $Y_p$ and $X_p$ are corrected in a second cycle by means of second multiplier 700 and first multiplier 698, respectively. All corrected signals $Y_{pc}$, $X_{pc}$, $E_{pc}$ are refed from data bus output 276 of the ZLC calculator 268 to high speed processor 258 via data bus input 256. The high speed procesor 258 then reads out the corrected signals $Y_{pc}$, $X_{pc}$, $E_{pc}$ via FIFO 272 for further processing and/or display.

Figure 11:
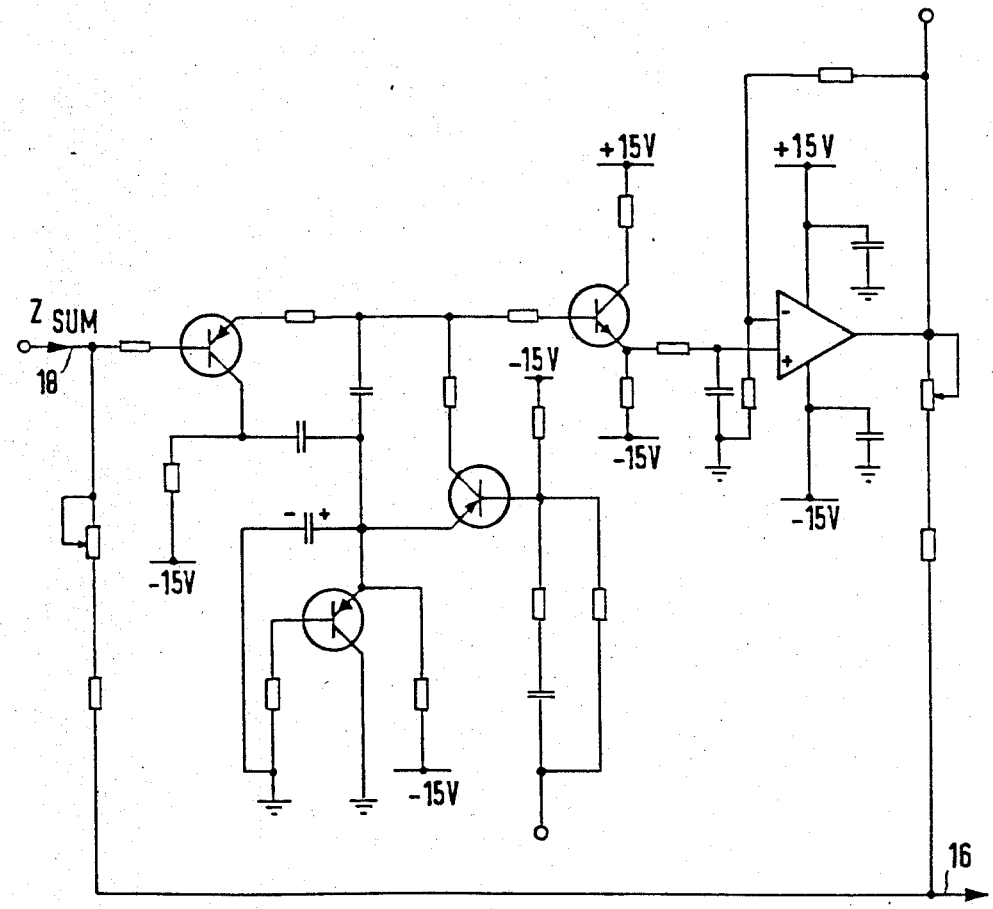
FIG. 11 is a more detailed circuit diagram of the inner structure of the dynamic threshold generator in FIG. 1A.

FIG. 11 finally illustrates a more detailed circuit diagram of the inner structure of the dynamic threshold generator in FIG. 1A.

Having thus described the invention with particular reference to the preferred forms thereof, it will be obvious to those skilled in the art to which the invention pertains, after udnerstanding the invention, that various changes and modifications may be made therein without departing from the spirit and scope of the invention as defined by the claims apended hereto.

What is claimed is:

1. A method for digitally integrating sequentially occurring groups of digital signals, each group including a plurality of sequentially occurring digital signals wherein the first digital signal of a given group occurs at a time after the first digital signal of the group which immediately precedes said given group but not necessarily after the last signal of said immediately preceding group, comprising the steps of:

beginning with the first digital signal of said preceding group,
   (a) successively supplying sequential ones of said plurality of digital signals to be integrated to a digital adder thereby successively generating digital adder output signals;
   (b) storing each one of said digital adder output signals in a first store;
   (c) supplying each one of said stored digital adder output signals to the digital adder; and
   (d) adding each stored digital adder output signal supplied to said adder to a succeeding one of said plurality of digital signals supplied to the adder for integrating said plurality of digital signals in said first store; and beginning with the first signal of said given group,
   (e) successively supplying sequential ones of said plurality of digital signals to be integrated to said digital adder thereby successively generating digital adder output signals;
   (f) storing each one of said digital adder output signals in a second store instead of said first store;
   (g) supplying each one of said stored digital adder output signals of said second store to the digital adder; and
   (h) adding each stored digital adder output signal supplied to said adder to a succeeding one of said plurality of digital signals supplied to the adder for integration of said plurality of digital signals in said second store; and processing said signal stored in said first store for generating a correction signal for correcting at least one of said signals stored in said first and said second stores, when said first signal of said given group occurs before the last signal of said immediately preceding group.

2. The method according to claim 1, further comprising the step of converting a plurality of analog signals into said plurality of sequentially occurring digital signals which are supplied to said adder.

3. An integrator circuit for digitally integrating sequentially occurring groups of digital signals, each group including a plurality of sequentially occurring digital signals wherein the first digital signal of a given group occurs at a time after the first digital signal of the group which immediately precedes said given group but not necessarily after the last signal of said immediately preceding group, comprising:

(a) a digital adder having a first digital input for receiving said sequential digital signals to be integrated, a second digital input and a digital output for supplying added digital signals;

(b) a digital storage means including at least first and second digital stores, each store having a digital input connected with the digital output of the adder and having a digital output connected with the second digital input of the adder; and (c) an integrator control means for controlling the adder and the storage means such that beginning with said first digital signal of said immediately preceding group, each of said added digital signals from the digital output of the adder are supplied to the first store of said storage means and then supplied form the digital output of the first store of said storage means to the second digital input of the adder for being added to the next succeeding digital signal appearing at the first digital input of the adder and, beginning with the first digital signal of said given group, each of said added digital signals from the digital output of the adder are supplied to the second store of said storage means and then supplied from the digital output of the second store of said storage means to the second digital input of the adder for being added to the next succeeding digital signal appearing at the first digital input of the adder.

4. The integrator circuit according to claim 3, further comprising an analog-to-digital converter having an analog input for analog signals and a digital output for supplying said plurality of sequentially occurring digital signals and having a control input, wherein the digital output is connected with the first digital input of the adder and wherein the control input is connected with the control means for controlling the analog-to-digital converter to convert said analog signals into said digital signals according to a certain sample rate.

5. The integrator circuit according to claim 4, wherein the integrator control means comprises:

a logic start control means having an output for generating a start pulse at the beginning of each integrating time period; and an oscillator means for generating control signals for the analog-to-digital converter to convert analog signals into said groups of digital signals according to the certain sample rate, said oscillator control means comprising an oscillator having an output for generating output signals of a first frequency, a down counter having an input and an output for generating output signals of a lower second frequency from the output signals of the oscillator and a gate having a first and second input and an output:

wherein the second input of the gate is connected with the output of the oscillator and the output of the gate is connected with the input of the down counter and wherein the first input of the gate is connected with the output of the logic start control, such that at the occurrence of a start pulse the gate is switched to transfer output signals of the oscillator to the down counter and wherein the output of the down counter is connected with the control input of the analog-to-digital converter.

6. The integrator circuit according to claim 5, wherein the oscillator comprises a 120 MHz oscillator and the down counter comprises a 30 MHz down counter.

7. The integrator circuit according to claim 3, wherein:

said first digital store comprises a first digital register having a digital input and a digital output;

said second digital store comprises a second digital register having a digital input and a digital output; and said integrator control means includes a switching means coupled to the first and second digital registers for alternatingly enabling said first and second digital registers to store the digital output of the digital adder and simultaneously switching the second digital input of the digital adder between the output of the first digital register and the output of the second digital register.

8. The integrator circuit according to claim 7, wherein said integrator control means includes:

logic start control means having an output terminal at which is supplied a start pulse generated substantially simultaneously with the first digital signal of each group wherein said first signal occurs after the occurrence of the last signal of the immediately preceding group; and said switching means is responsive to said start pulse for alternately switching the second digital input of the digital adder between the outputs of said first and said second digital registers, respectively.

9. The integrator circuit according to claim 8, wherein the time period between each start pulse is approximately 700 ns.

10. The integrator circuit according to claim 7, wherein said integrator control means includes:

pile-up detection means having an output terminal for supplying a pulse pile-up detection signal generated sbustantially simultaneously with the first digital signal of a given group of digital signals wherein said first digital signal of said given group occurs before the last digital signal of an immediately preceding group; and said switching means is responsive to said pulse pile-up detection signal for alternately switching the second digital input of the digital adder between the outputs of said first and second digital registers, respectively.

11. The integrator circuit according to claim 7, wherein the first digital register further comprises a read out output and the second digital register further comprises a read out output and further comprising means for alternatingly reading out one register at the associated read out output while supplying new digital information to the other register at the associated digital input.

12. The integrator circuit according to claim 7, wherein (a) the digital output of the digital adder is constantly connected with both the digital input of the first register and the digital input of the second register; and (b) the integrator control means comprises means for alternatingly enabling the first register via an enable input terminal of said first register and the second register via an enable input terminal of said second register.

13. The integrator circuit according to claim 12, wherein the integrator control means comprises:

(c1) a logic start control means having an output terminal at which is supplied a start pulse generated substantially simultaneously with the first signal of each of said sequentially occurring groups of digital signals wherein said first signal occurs after the last signal of an immediately preceding group; and (c2) an enable logic circuit having an input terminal and a first output terminal at which a first enable signal is supplied and a second output terminal at which a second enable signal is supplied; and wherein the input terminal of the enable logic circuit is connected with the output terminal of the logic start control means and the first output terminal of the enable logic circuit is connected with the enable input terminal of the first register and the second output terminal of the enable logic circuit is connected with the enable input terminal of the second register of the switching means such that alternatingly with the occurrence of said start pulses of the logic start control means, the enable logic circuit alternatingly generates said enable signals at its first and second output terminals for alternatingly enabling said first and second registers.

14. The integrator circuit according to claim 13, wherein the swtiching means comprises a selector switch between the second digital input of the digital adder and each digital output of the first and second registers, said selector switch is connected with the first and second enable output terminals of the enable logic circuit for switching the selector switch between a first switch position where the selector switch connects the second input of the adder with the output of the first register at the occurrence of an enable signal at the first output terminal of the enable logic circuit and a second switch position where the selector switch connects the second input of the adder with the output of the second register at the occurrence of an enable signal at the second output terminal of the enable logic circuit.

15. The integrator circuit according to claim 13, further including:

pile-up detection means having an output terminal for supplying a pulse pile-up detection signal generated substantially simultaneously with the first digital signal of a given group of digital signals wherein said first digital signal of said given group occurs before the last digital signal of an immediately preceding group.

16. The integrator circuit according to claim 15, wherein the enable logic circuit further comprises a second input terminal for receiving said pulse pile-up detection signal and the enable logic circuit generates said first enable signal at the occurrence of said start pulse and switches off the first enable signal and generates said second enable signal at the occurrence of said pulse pile-up detection signal.

17. The integrator circuit according to claim 7, wherein the switching means comprises a selector switch connected between the second digital input of the digital adder and each digital output of the first and second registers.

18. The integrator circuit according to claim 3, further including:

signal processing means coupled to at least one said first and second stores and responsive to the digital signal stored therein for developing at least one corrected digital signal when the first signal of said given group occurs before the last signal of said immediately preceding group, said corrected digital signal being representative of an integration of all the digital signals of one of said immediately preceding or said given groups.

19. An integrator for digitally integrating input signal response representative of first and second sequentially occurring events, the beginning of said second event occurring after the beginning of said first event but not necessarily after the end of said first event, comprising:
- means responsive to said input signal response for generating sequentially occurring digital signals;
- a digital adder having a first input responsive to said digital signals, a second input and an output for supplying added digital signals representative of integration of sequential ones of said digital signals;
- means responsive to said input signal response for providing a pulse signal substantially simultaneously with the beginning of said second event;
- first and second digital storage means each having an input coupled to the output of said digital adder for storing selected ones of said added digital signals; and
- control means responsive to said pulse signal for developing control signals which are applied for controlling which ones of said added digital signals are selected for storage in said first and second digital storage means, said first digital storage means being controlled so as to store an added digital signal from said adder which is representative of at least a partial integration of the input response of said first event while said second digital storage means is controlled to store and then supply sequential ones of said added digital signals supplied by said digital adder to said second input of said digital adder for developing an added digital signal representative of integration of at least a portion of the input response of said second event.

20. The integrator circuit according to claim 19, wherein:
- said means for generating sequentially occurring digital signals comprises an analog to digital converter responsive to said input signal response for periodically supplying at its output a digital signal representative of the amplitude of said input signal response; and
- said first and second digital storage means each have an output for supplying a digital signal stored therein to said second input of said digital adder, said control means causing only one of said first and second storage means at a time to couple the digital signals stored therein to said second input of said digital adder.

21. The integrator circuit according to claim 19, further including:
- signal processing means coupled to at least one said first and said second digital storage means and responsive to the added digital signal stored therein for developing at least one corrected added digital signal if said second event occurred before the end of said first event.

* * * * *